United States Patent
Medvinsky et al.

(10) Patent No.: US 12,407,516 B2
(45) Date of Patent: Sep. 2, 2025

(54) ANTI-CLONING ARCHITECTURE FOR DEVICE IDENTITY PROVISIONING

(71) Applicant: ARRIS Enterprises LLC, Suwanee, GA (US)

(72) Inventors: Alexander Medvinsky, San Diego, CA (US); Xin Qiu, San Diego, CA (US); Ting Yao, San Diego, CA (US); Jason Pasion, San Diego, CA (US); Oscar Jiang, West Covina, CA (US); Rafie Shamsaasef, San Diego, CA (US); Tat Keung Chan, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 252 days.

(21) Appl. No.: 18/195,624

(22) Filed: May 10, 2023

(65) Prior Publication Data
US 2023/0370270 A1 Nov. 16, 2023

Related U.S. Application Data

(60) Provisional application No. 63/340,451, filed on May 10, 2022.

(51) Int. Cl.
*H04L 9/32* (2006.01)
*H04L 9/08* (2006.01)
*H04L 9/40* (2022.01)

(52) U.S. Cl.
CPC .......... *H04L 9/3226* (2013.01); *H04L 9/0877* (2013.01); *H04L 9/3242* (2013.01); *H04L 9/3263* (2013.01); *H04L 63/20* (2013.01)

(58) Field of Classification Search
None
See application file for complete search history.

(56) References Cited

U.S. PATENT DOCUMENTS 9,043,456 B2* 5/2015 Kuramoto ........... H04L 63/0823
 713/153
9,838,384 B1* 12/2017 Kane-Parry ........... G06F 21/316
(Continued)

OTHER PUBLICATIONS

International Search Report and Written Opinion RE: Application No. PCT/US23/21741, dated Aug. 1, 2023.
(Continued)

*Primary Examiner* — Benjamin E Lanier
(74) *Attorney, Agent, or Firm* — Chernoff, Vilhauer, McClung & Stenzel, LLP

(57) ABSTRACT

A method and apparatus, and system for providing device credentials to a plurality of devices is disclosed. The system comprises a credential builder, for generating the credentials or procuring the credentials from a source external to the credential distribution system; a credential loader; a credential server, for accepting credential requests from the devices and for receiving the requested credentials from the credential loader; a first secured interface, communicatively coupling the credential loader and the credential server; a second secured interface, communicatively coupling the credential server and the device; a central credential database, communicatively coupled to the credential loader, for storing each the credentials and a provisioning history of each of the credentials; a credential server database, communicatively coupled to the credential server, for storing the credentials local to the credential server; and a cloning detection system, communicatively coupled to the central credential database and the credential server database, the cloning detection system for detecting duplicate credentials using the credentials stored in the central credential database and the credential server database.

19 Claims, 6 Drawing Sheets

(56) References Cited

U.S. PATENT DOCUMENTS

| | | | | |
|---|---|---|---|---|
| 2010/0070769 | A1* | 3/2010 | Shima | H04L 9/3271 |
| | | | | 380/46 |
| 2010/0248720 | A1 | 9/2010 | Millet et al. | |
| 2017/0346821 | A1* | 11/2017 | Yedidi | H04L 63/0884 |
| 2019/0245701 | A1* | 8/2019 | Chen | H04L 9/3236 |
| 2022/0394024 | A1* | 12/2022 | Bulgakov | H04L 67/51 |
| 2023/0007932 | A1* | 1/2023 | Siddiqui | H04W 12/08 |

OTHER PUBLICATIONS

Broadband Forum: "TR-069 for example, the Device ID is an address formatted according to the Technical Report 069 standardized by the Broadband Forum", Dec. 31, 2006, pp. 1-131, XP093061489, Retrieved from the Internet: URL:https://www.broadband-forum.org/pdfs/tr-069-1-1-10.pdf [retrieved on Jul.6, 2023] p. 96-p. 97.

* cited by examiner

ANTI-CLONING ARCHITECTURE FOR DEVICE IDENTITY PROVISIONING

CROSS REFERENCE TO RELATED APPLICATIONS

The present application claims priority to U.S. Provisional App. No. 63/340,451, filed May 10, 2022, the contents of which are each incorporated herein by reference in their entirety

BACKGROUND

1. Field

The present disclosure relates to systems and methods for preventing identify information to devices, and in particular to a system and method for preventing the cloning of such devices using the identity information.

2. Description of the Related Art

Cloning involves copying the identity of a device or host to another and making a replica of the original one. Cloning poses significant threats to companies providing hardware and software solutions. An unauthorized entity can potentially take advantage of the cloned hardware, software or system to hijack sensitive and valuable assets or perform unauthorized transactions.

It is relatively easy (intentionally or unintentionally) to place one digital credential into multiple devices, resulting in security risks. Cloning can occur in various layers or components of an end-to-end provisioning system without adequate safeguards to protect entire process. For example, the handling of credentials such as keys or certificates are very different from handling electronic components and software in manufacturing procedures, and each requires a different solution to prevent cloning. Intentional sabotages to system allow attackers to go after the most vulnerable part of the system and work their way around to achieve their exploitation goals, such as making counterfeit devices.

Cloning detection and prevention mechanisms are critical to device provisioning process in order to eliminate potential volume cloning problems. However, anti-cloning techniques are typically localized and highly specific and do not consider all systemic weaknesses that can allow cloning to occur. There is therefore a need for an end-to-end approach to combat cloning throughout the system as the workflow is being executed. This should be applicable to different platforms, devices, and deployment environments, so that different aspects of such attacks can be handled. Also, system wide monitoring and intelligence should be available to identify and report instances of cloning.

SUMMARY

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

The systems and method disclosed herein present a comprehensive anti-cloning mechanism and counterfeit prevention to detect and protect end-to-end provisioning system against various threats posed by such attacks. This solution covers the entire provisioning workflow from generation, delivery, personalization, and all the way down to end devices. It includes built-in attack detection, and eliminates cloning without compromising the performance of the end-to-end system.

Instrumentation tools throughout the end-to-end provisioning system are provided to ensure detection and presentation of anti-cloning attacks. The anti-cloning system solutions are applied to PKI Center Components, servers throughout the system, factory stations used to install credentials, and the end devices themselves, and are also applied on a protocol and device application level.

Factory Credential Provisioning

Figure 1:
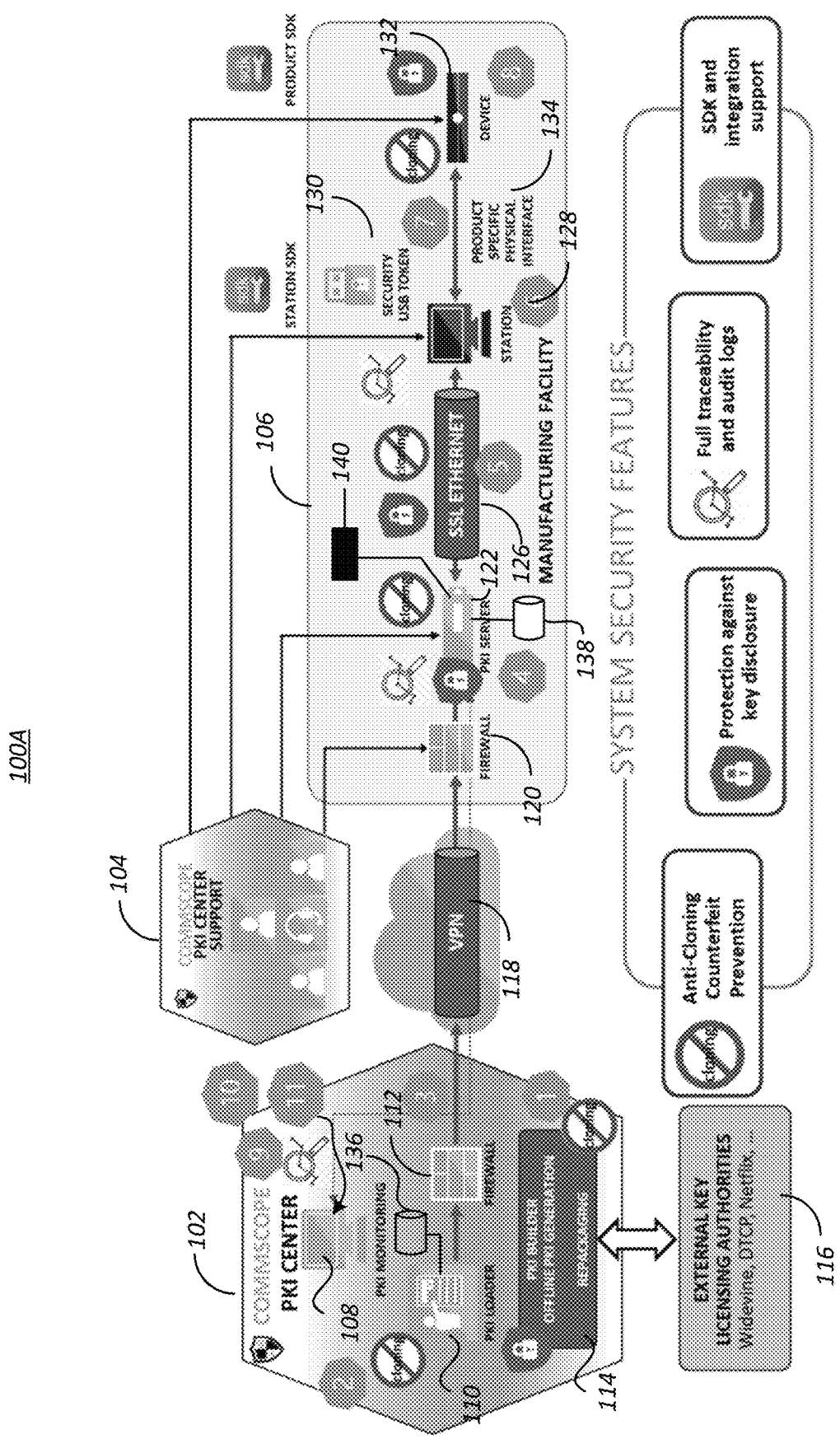
FIG. 1 is a diagram illustrating a system for distributing encrypted device unique credentials for installation and deployment at the device factory.

FIG. 1 is a diagram illustrating a system 100A for distributing encrypted device unique credentials for installation and deployment at the device factory. An overview of the system 100A is presented below, and additional details regarding this system and its operation are presented in U.S. Pat. No. 8,761,401, which is hereby incorporated by reference.

FIG. 1 is a diagram depicting the infrastructure used to securely provision the unique identities to the devices. The system 100A includes a credential generation facility 102 that includes a credential generator 114 and a credential download server or loader 110. The system 100A also includes a manufacturing facility 106 that includes a credential server (CS) 122, a credential station 128 or product interface infrastructure 134 that allows the credential station 128 to interface with one or more products (hereinafter alternatively referred to as device(s) 132) that use credential and/or other information.

For purposes of discussion herein, the term "credentials" refers to one or more of digital certificates, public keys and other confidential information that is loaded into manufactured devices, such as symmetric cryptographic keys, private keys, passwords, and other secret values.

As will be discussed in greater detail hereinbelow, the credential loader 110 can be coupled to the credential server 122 via one or more networks. Also, the credential server 122 can be coupled to the credential station 128 via one or more networks. The credential station 128 typically is coupled to one or more device(s) 132 via a product-specific interface 134, which preferably is not a network. Before the credentials have been loaded onto the device 132, the device 132 does not yet have any cryptographic identity and cannot authenticate itself directly. Therefore, it is more secure to connect to the device via a non-networked interface that does not permit additional and possibly unauthorized devices or computers to be attached to that network. The system 100A also can include a monitoring server 108 coupled between the credential server 122 and the credential generator 114 for monitoring the status of the credential server 122.

Credential data generated by the credential generator 114 is preferably transported to the credential loader 110 using a secure interface that prevents hackers from somehow breaking through a firewall and obtaining unauthorized access to the credential generator 114. Alternatively, the credential generator 114 is able to securely transport credentials directly to a credential server 110.

The credentials generator 114 can include one or more appropriate components for generating keys, such as private keys and public keys, digital certificates and/or other credential data and information used by products. For example, the credential generator 114 can be or include a hardware security module or HSM. Also, the credential generator 114 can include or be part of a certificate authority (CA). The credential data generated by the credential generator 114 typically is encrypted using two layers of encryption before the generated credentials are transmitted from the credential generator 114 to the credential loader 110.

The credential loader 110 sends the credential data to the credential server 122, e.g., via network 118 such as a virtual private network (VPN). Alternatively, the logical function of the credential server 122 can be merged into the credential station 128 and the credential loader 110 can then connect to the credential station 122, e.g., via one or more of the network 118. The credential server 16 includes a database 136 that stores a relatively large amount of credential data. During the personalization of a specific manufactured product, the credential server 122 delivers, on demand, a unique and previously unused set of credential data to the credential station 128, e.g., via the network 126. The credential server 122 retains a relatively large supply of credential data in its database 138 and thus guards against network connectivity interruptions between the credential loader 110 and the credential station 122.

The credential station 128 forwards credential data to one or more of device(s) 132, e.g., via the product-specific interface 134. The credential station 128 also is configured to bridge between the standardized output interface of the credential server 122 and the variable, possibly non-standard input interface 134 of one or more of the device(s) 132. The device(s) 132 can be any suitable device that uses keys and/or other credential data or information for some purpose, e.g., digital rights management (DRM). For example, one or more of the product device(s) 132 can include but is not limited to a digital video recorder (DVR) or digital video server (DVS) device, including any signal converter or decoder (set-top) box with internal and/or external recording capabilities and local and/or remote storage, which often are referred to as personal video recorder (PVR) devices. Other suitable manufactured products a digital video disk recorder, a computer, a television, and any suitable mobile end user communication device, such as a cellular telephone, a smartphone, a personal digital assistant (PDA) device or other wireless handheld device, a digital camera, a laptop personal computer (PC) or a notebook PC.

The network 118 can be any private network or network server arrangement suitable for coupling directly or indirectly between the credential loader 110 and the credential server 122. The network 126 can be any private communication network or network server arrangement suitable for coupling directly or indirectly between the credential server 122 and the credential station 128. For example, all or a portion of the network 118 and/or the network 126 can be an Internet virtual private network (VPN) or other suitable private Internet protocol (IP) based network, computer network, web-based network or other suitable wired or wireless private network system. The product-specific interface 134 preferably is a local non-networked interface, such as a serial connection or a non-networked Ethernet connection with a cross-over cable, suitable for coupling directly or indirectly between the credential station 128 and one or more device(s) 132 manufactured at the product personalization facility.

The system 100A includes one or more layers of encryption for transmitting credential data from the credential data generation facility to the product personalization facility and the device(s) 132 manufactured therein. For example, as discussed hereinabove, the credential data generator 114 encrypts credential data end-to-end generated therein using a secret global inner-layer key that is pre-shared with the manufactured products and can only be removed by the manufactured product itself. In this context, the term "end-to-end" indicates that any intermediate servers (e.g., credential servers) do not have access to this key pre-shared with the manufactured product. Also, credential server (CS)-specific encryption can be used in addition to the end-to-end encryption, e.g., for credential data being delivered from the credential generator 114 to the credential loader 110. Such encryption is referred to herein as CS-specific encryption to reflect both types of encryption being used.

On top of the inner-layer key and the CS-specific encryption, a secure tunnel can be applied to the credential data transmitted from the credential loader 110 to the credential server 122. This secure tunnel is used to authenticate the identities of the credential loader 110 and/or the credential server 122 and could optionally add another layer of encryption. This secure tunnel guards against illicit loading of data to the credential server 122 or spoofing output status data of the credential server 122, such as data involving the inventory of stored keys and/or other credential data on the credential server 122. Standard protocols such as Secure Socket Layer (SSL), Transport Layer Security (TLS) or Internet Protocol security (IPsec) can be used for this purpose. This secure tunnel is referred to herein as the credential loader secure tunnel. The credential server 122 also can make use of an authenticated key agreement to create a one-time shared session key, e.g., for one set of credential data transmitted from the credential server 122 to the manufactured product 132 via the credential station 128. For example, the authenticated key agreement protocol may be Diffie-Hellman (DH) signed using the Rivest Shamir Adleman (RSA) algorithm, RSA-based key agreement, or Elliptic Curve Diffie-Hellman (ECDH) signed using the Elliptic Curve Digital Signature Algorithm (ECDSA). The credential station 128 itself does not participate in the authenticated key agreement. Because the credential station 128 is product-specific, it is typically designed and developed using personalization facility staff or other personnel without expertise in security. Therefore, the credential station 128 is less trusted than the credential server 122, and therefore acts only as a proxy. The credential station 128 is not trusted to participate in the authenticated key agreement.

The authenticated key agreement consists of the credential server 122 and the product generating random public/private key pairs and exchanging their key agreement public keys. Each side uses its key agreement private key and the other side's key agreement public key to come up with a shared key can be referred to as the CS session key.

The credential server 122 typically removes the CS-specific encryption layer (i.e., decrypts the CS-specific encryption layer with a CS-specific database key) from a set of credential data retrieved from its database before the authenticated key agreement takes place and CS session key encryption layer is added. The CS-specific database key is preferably protected by an HSM 130 on the credential server 122. Therefore, the resulting encryption is referred to herein as CS session key encryption. A CS secure tunnel may be added on top of the CS session key-encrypted credential data, e.g., before passing the credential data from the credential server 122 to the credential station 128. The CS secure tunnel is used to authenticate the identities of the credential server 122 and/or the credential station 128, and optionally adds another layer of encryption. For example, a standard protocol, such as SSL, TLS or IPsec may be used to implement the CS secure tunnel.

As mentioned previously, the credential station 128 is less trustworthy than the credential server 122. Therefore, preferably, the private key of the credential station 122 that is used in the setup of this secure tunnel is protected within an HSM 130, which is a tamperproof device, such as a universal serial bus (USB) token or a peripheral component interconnect (PCI) card, installed in the credential station 128.

The credential station 128 typically removes the SSL encryption layer and passes credential data to the manufactured product 132 using CS session key encryption. The product 132 removes the CS session key encryption layer, leaving the end-to-end encryption originally added by the credential data generator 114. In addition to the encryption layers discussed, the network 118 and/or the network 126 may provide other additional encryption layers. Also, the product-specific interface 134 may provide its own interface-specific encryption layer in addition to the CS session key encryption.

The CS secure tunnel used for credential data transfer between the credential server 122 and the credential station 128 also is used by the credential server 122 to limit access to credential data only to a specific list of credential stations 128. Such list is called an Access Control List (ACL). That is, the credential server 122 securely obtains the identity of the credential station 128 during the secure tunnel establishment and then checks that this specific identity corresponds to an authorized credential station 128 that is in the ACL. For example, the identity of the credential station 128 may be an IP address and it may be securely obtained from a digital certificate of the credential station 128.

The CS-specific encryption used for credential data transfer between the credential data generator 114 and the credential server 122, e.g., via the credential loader 110, is used to assure that keys and other credential information intended for a specific credential server 122 can be used only on the specific target credential server 122. In this manner, the CS-specific encryption prevents any misrouting of credential data from the credential loader 110 to an incorrect credential server 122. This also prevents unauthorized backup and restore of the credential data from the intended credential server 122 to another (unauthorized) credential server. In the interface between the credential loader 110 and the credential server 122, optionally the credential loader 110 can query from the credential server 122 the identity of its CS-specific encryption key. This identity can be for example the hash of the CS-specific encryption key. By checking the identity of the CS-specific encryption key ahead of time, the credential loader 110 avoids loading incorrectly encrypted data to a credential server 122 that it later cannot use. Also, the CS session key encryption used for credential data transfer between the credential server 122 and one or more of the device(s) 132 is used to guard against passive message replay attacks between the credential server 122 and the device(s) 132, even though the device(s) 132 do not yet have a cryptographic identity to use with conventional classic authentication.

The end-to-end encryption used for credential data transfer between the credential data generator 114 and the device (s) 132 is used to assure that only the intended device(s) 132 of a specific model can decrypt the keys and/or other credential data intended for it. If the encryption used is asymmetric, i.e., where a different key is used for encryption than decryption and only the decryption key resides in the product of interest (e.g., asymmetric cryptography where both encryption and decryption keys are kept secret), the encryption also assures that no data illicitly extracted from the product of interest will allow a non-authorized user to encrypt data for that family of products. Typically, there is only one end-to-end encryption key and one end-to-end decryption key for one family of products, such as a specific device model. Even within the same product, different keys that are used by different hardware or software modules may be encrypted using a different end-to-end key.

Online Credential Provisioning

Figure 2:
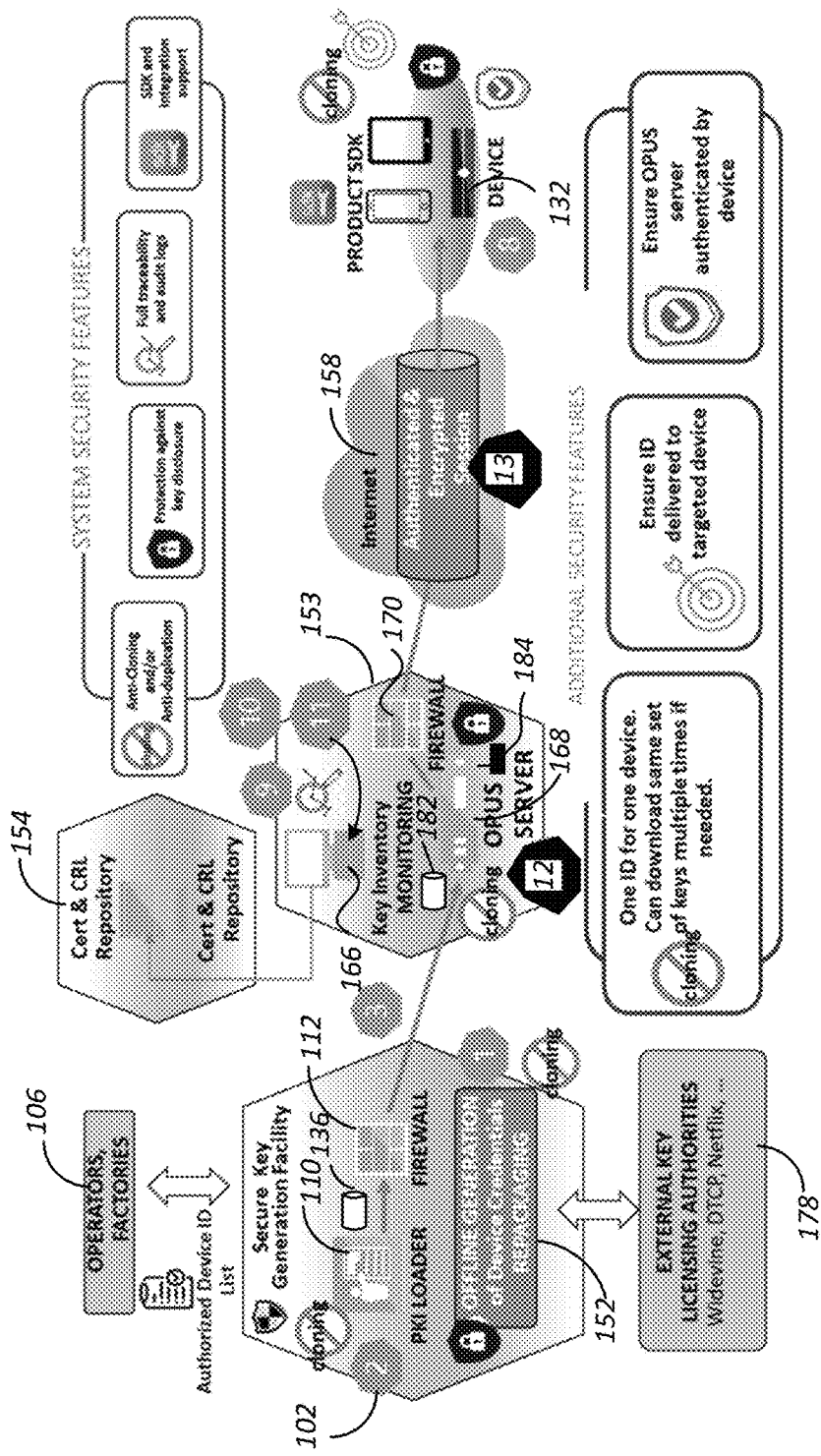
FIG. 2 is a diagram illustrating an online credential system for distributing encrypted device unique credentials for installation on fielded devices.

FIG. 2 is a diagram illustrating an online credential system (OCS) 100B for distributing encrypted device unique credentials for installation on fielded devices. The credential generation facility 102 of the system 100B that utilizes an Offline Certificate Authority (OFFCA) 152 to generate client public/private key pairs, encrypt the private keys and issue the corresponding digital certificates. This information is transferred to an intermediary certificate authority or online CA 156 which does not possess the means to decrypt or modify the device private keys. However, the update server 168 (at the time of receiving a certificate request) can extract the public key and other relevant information from an initial device certificate (origin certificate) and sign a new device certificate (Final Certificate) which includes information from the request. In this context, the signing of a data refers to a digital signature scheme in which a message or data is "signed" with a signature produced from the data and a private key of a private/public key pair generated by a key generation algorithm. The private key is typically selected uniformly at random from a large set of possible private keys. The message is then transmitted with the public key corresponding to the private key used to sign the message. The recipient of the message can then verify the authenticity of the message (that it came from the sender of the message) using the message, the included public key, and the signature.

This solution allows for flexibility offered only by an update server 168 and can generate device certificates with device information which is only available at the time of a certificate request. And it improves security of the system by limiting the functions that the update server 168 needs to perform. Since the update server 168 is not able to generate, replace or access device private keys and is also limited to what information it can generate and add into Device Certificates, none of the device private keys will be exposed, even if the update server 168 is compromised.

The server 168 update server 168 obtains encrypted device private keys and origin certificates from the OFFCA 152 and therefore cannot generate more device private keys and origin certificates than what has been already provided by the Offline CA. Once a security compromise of the update server 168 becomes known, the update server 168 no longer receives new encrypted device private keys and origin certificates, limiting how many individual Device Certificates would later need to be revoked and replaced.

The OCS 100 comprises a credential generation facility 102 having the OFFCA 152.

The OFFCA 152 generates device private keys, the corresponding public keys, and the origin certificates (which contain the device public keys). The type of the device private key and device public key in the certificate may be Rivest-Shamir-Adleman (RSA), Elliptic Curve, ElGamal, digital signature algorithm (DSA) or any other type of public/private key pair.

The credential loader 110 encrypts the device private keys. In one embodiment, each device private key is separately encrypted using a key that is not accessible to the update server 168. For example, the encryption key used to encrypt each of the private keys may be a Private Key Encryption Key (PrKEK) that is global, unique per client device 132 model or may even be a unique value that has been separately pre-provisioned into each target client device 132 or chip within the target client device 132.

Importantly, PrKEK is not available to the update server 168, and the update server 168 does not need to decrypt or make any further modifications to the device private keys received from the OFFCA 152. In one embodiment, PrKEK is available only to the target client devices 132. In other embodiments having a proxy agent (described further below interposed between the update server 168 and the target client devices 132), PrKEK may be available to the proxy agent, which provides an indirect network connection between the update server 168 and client devices 132. The proxy agent is more fully discussed below.

In one embodiment, an optional second layer of encryption is imposed wherein the device private keys are further encrypted (e.g. double encrypted) using an encryption key that is specific to a particular update server 168 instance or server. Hereinafter, that optional encryption key is referred to as an Outer Layer Encryption Key (OLEK).

The credential loader 110 makes copies of the origin digital certificates and encrypted private keys and archives them in a credential repository or database 136. This archived information can be used to generate reports at a later time or for re-provisioning the device private key and origin certificates to client devices 132 that lose their private key and/or certificate, for example, because of corruption of a memory of the client device 132 itself. This permits the same device PKI to be re-provisioned into such devices.

Regulations or customer requirements may prohibit the saving of device private keys in the data repository 136, or limit the period for which such device private keys may be saved or archived (after which, they must be erased), even when the device private keys are in encrypted form. In such embodiments, the device private keys are not archived. However, even in such cases, the origin digital certificates may be archived, as there are typically no prohibitions to saving or retaining the origin digital certificates.

The pre-generated and encrypted device private keys and origin certificates are transferred to the update server 168. These pre-generated encrypted private keys and origin digital certificates are later retrieved and use by the update server 168 in responding to certificate requests from the client devices 132.

Optionally, the interface used to transfer this information is authenticated, e.g., using TLS or SSL, to ensure that all PM transferred to an update server 168 came from a legitimate source and to avoid denial of service attacks.

The client device 132 and update server 168 establish a secure (encrypted and authenticated) session—for example using 2-way authenticated TLS protocol. This operation is optional since it is possible to encrypt/authenticate each transaction separately (as described below), without using a separately pre-established secure session between the client device 132 and the update server 168. Also, a secure session may instead be established between the update server 168 and the aforementioned proxy agent. In that case, the process of establishing a secure session could occur earlier, any time prior to one of the client devices 132 submitting a request to the update server 168 for an identity (operation seven below) via the proxy agent.

The client device 132 requests an identity that includes a client device private key and a digital certificate. This request may include an identifier of the client device 108 (device ID) and/or serial number as well as client device 132 model information. This optional information may be included in the device certificate that is generated by the update server 168 and returned to the client device 132.

The request for the identity may be authenticated (e.g. digitally signed) by the requesting client device 132 using a pre-existing private key and digital certificate that are already stored in the client device 132. This pre-existing private key and digital certificate may be unique in a variety of ways (e.g. unique among all devices from all sources, unique among devices from a particular source or among devices of a particular class or model).

The request may be delivered directly to the update server 168 or it may be first delivered to the proxy agent. The proxy agent may simply forward the request message as is to the update server 168.

Alternatively, the proxy agent may verify the signature on the request message (if the message includes a signature) as well as check authorization of the requesting client device 132 for requesting certificates. If both checks pass, then the proxy agent re-signs the same request with the signing key belonging to the proxy agent, and forwards the message to the update server 168.

In some embodiments, in addition to or instead of a secure session established during process six, this request message may include a Client Key Agreement Public Key (CKAPK). CKAPK may for example be a Diffie-Hellman (DH) or Elliptic Curve Diffie-Hellman (ECDH) public key and it will be utilized to protect the private key that is returned by ONCA 106 in a later step. CKAPK may be generated by either the client device 108 or by the proxy agent 110.

CKAPK needs to be generated together with the corresponding Client Key Agreement Private Key CKAPrK, as they are paired keys.

The update server 168, upon receiving the request, first validates the provided authorization by assuring that whichever entity signed the request (either proxy agent or client device 132) is authorized to obtain the identity for the client device 132 (e.g. client device certificate and device private key) which is being requested. If authorization fails, update server 168 returns an error code rather than a valid device private key and device certificate.

The update server 168 finds the next available (not yet assigned to a client device 132) origin certificate and encrypted device private key from its local repository (i.e., database) 182. The update server 168 later generates a new device certificate that is derived from the origin certificate while keeping the encrypted device private key the same as the previous encrypted device private key.

After validating authorization, the update server 168 finds a certificate template that matches a specific client device 132 model for this request from a certificate template database such as the certificate and CRL repository 154. A certificate template includes information such as certificate lifetime and various certificate attributes and extensions that are required to be present in the device certificate. The same set of origin certificates that are issued by the same ONCA 153 and have the same profile can be mapped to different certificate templates and different signing key based on a configuration of the update server 168, or they can be paired with one specific certificate template.

Many of such attributes and extensions may already be present in origin certificates generated by the OFFCA 152. However, some attributes such as a device ID, chip ID, device serial number, device software (SW) and hardware (HW) version may not have been known ahead of time to the OFFCA 152. In one embodiment, the certificate template indicates which of those attributes need to be added to the origin certificate to generate the device certificate issued by update server 168 and where such attributes fit into the device certificate.

It is possible for multiple client device 132 models to share the same certificate template. The reverse is also true—it is possible for one client device 132 model to support multiple certificate templates. In the latter case, a request message sent earlier would specify which certificate template is being requested. Optionally, the update server 168 may determine which certificate template and which signing key should be applied to the new client device certificate based on information in the request message coming from the device.

Optionally, the certificate template may contain a digital signature from the OFFCA 152 which needs to be verified by the update server 168 before the certificate template can be used. This digital signature guards against unauthorized corruption of the certificate templates in the ONCA's certificate template database 154.

Before generating a client device certificate, the update server 168 accesses a Certificate Authority signing key that the update server 168 will use to sign the client device digital certificate. This CA signing key is typically referenced by the certificate template. This CA signing key may be stored in a hardware security module (HSM) 184 which is communicatively coupled to a computer or other hardware device of the update server 168. In that case, update server 168 obtains a handle to the CA Signing Key inside the HSM 184, and the handle can be later used to sign a device certificate.

In other cases, the CA signing key may be stored as an encrypted value which is referenced by the certificate template. In such an embodiment, the update server 168 sends the encrypted CA signing key to the HSM 184, and the HSM 184 "unwraps" (e.g. decrypts) the CA signing key inside the HSM 184. The update server 168 then utilizes the CA signing key to sign the device certificate.

The update server 168 builds a device certificate containing the encrypted device public key and selected other attributes from the origin certificate which was earlier retrieved. The remaining attributes in the new device certificate are determined based on the certificate template. Normally, that would include a validity period starting date based on the current date & time and a validity period ending date based on the device certificate lifetime determined by the certificate template. Other data such as a client device 132 identifier or serial number as well as other client device 132 attributes specified by the certificate template may be added to the device certificate 132 during this step. The update server 168 then signs the new device certificate using the CA signing key which is typically protected inside the HSM 184.

The ONCA 106 returns the just issued client device certificate along with the corresponding encrypted device private key (which are copied unchanged from the database or repository 154) to the requesting client device 132 in the response message. In addition to the optional protection provided by a secure session between the update server 168 and the requesting client device 132, the encrypted device private key may be further encrypted with a KAEK (Key Agreement Encryption Key). The KAEK is derived from a key agreement protocol such as Diffie-Hellman (DH) or Elliptic Curve Diffie-Hellman (ECDH).

Optionally in this step, update server 168 also returns the origin certificate containing the same device public key as the just issued device certificate.

The client device 132 generates a client key agreement public key (CKAPK) and a corresponding client key agreement private key (CKAPrK). Similarly, the update server 168 generates CA key agreement public key (CAKAPK) and corresponding CA key agreement private key (CAKAPrK). The client device 132 transmits the CKAPK to the update server 168 as a part of the request message. The update server 168 receives the client key agreement public key CKAPK, and uses the received client key agreement public key CKAPK to derive the KAEK from the client key agreement public key CKAPK and the CA key agreement private key CAKAPrK. This can be accomplished using a variety of methods including:

Diffie-Hellman KAEK=Derive(CKAPK$^{CAKAPrK}$mod p) and

Elliptic Curve DH KAEK=Derive (CAKAPrK*CKAPK)

where '*' denotes a special elliptic curve multiply operation that is well-known to those skilled in cryptography, and p denotes a prime number. The update server 168 then further encrypts the encrypted client device private key with the KAEK to generate the further encrypted client device private key ($E_{KAEK}$[Encrypted Client Device Private Key]), and transmits the client device certificate and the further encrypted device private key to the client device 132 in the response message. The client device 132 receives the response message, and uses the CA key agreement public key CAKAPK and the client key agreement private key CKAPrK to generate the key agreement encryption key KAEK. Then, the client device 132 decrypts the further encrypted client device private key using the generated key agreement encryption key KAEK to produce the encrypted client device private key.

The client device 132 optionally verifies that a received device certificate is valid and has a valid CA signature (using the CA signing key), then decrypts one or more layers of encryption from the device private key. For example, two layers of encryption may be inner-layer encryption with PrKEK (that was originally added by OFFCA 152) followed by outer-layer encryption with KAEK described in the previous operation. All such encryption layers are removed (the outer layer encryption with KAEK), after which the client device 132 verifies that the fully decrypted device private key corresponds to the device certificate and the device private key contained therein.

Alternatively, the proxy agent can perform the above verification and decryption steps and then can forward device certificate and device private key the target client device 132 over a separate connection.

Once the client device 132 possesses a fully decrypted and verified device certificate and device private key, the device certificate and device private key are installed locally on the target client device 132. Additional protection (for example, protection local to the device) may be added such as encryption or hardware based protection by use of a secure memory or a secure CPU in the client device 132.

Alternatively, the inner-layer encryption with PrKEK that was originally added to the device private key by OFFCA 152 may remain and the device private key encrypted with PrKEK may be stored in that manner persistently in the target client device 132. In such an embodiment, the target client device 132 removes the encryption with PrKEK from the device private key each time that it is utilized internally within the client device 132 to perform a crypto operation such as decryption or digital signature.

The origin certificate may also be transmitted by the update server 168 to the client device 132 in the previous operation. In this case, the origin certificate may be persistently saved in the client device 132 along with the device certificate and the encrypted device private key. The origin certificate may have a longer lifetime than the matching device certificate derived from the origin certificate and may be utilized in the future to request other or additional device certificates.

Device certificates that had been generated by update server 168 can be optionally copied back to the central PKI repository 136 for archival and for subsequent queries and reports.

An authorized administrator using a key generation facility administrative processor (for example, an individual working for a network operator which had deployed the client devices 132 may want to run some queries or reports on the device certificates that had been installed on client devices 132 in their network. The queries may count numbers of client devices 132 of various models that had been provisioned with client device certificates, run reports for specific time periods, for specific factory locations (if certificate provisioning took place in a factory), etc. This report may be optionally generated based on the contents of the central credential repository 136 and/or the certificate and CRL repositories 154 and 182 and returned back to the requesting administrator via key monitoring utilities 108 and 166.

While the foregoing describes the online credential system 100B in an implementation that uses origin certificates, other online embodiments may be practiced. For example, the online credential system 100B may be configured as described in U.S. Pat. No. 9,130,928, which is hereby incorporated by reference, and particularly to FIGS. 3A and 3B and the text appurtenant thereto.

FIGS. 1 and 2 include numerals within six-sided polygons. These numerals will now be referred to in describing anti-cloning techniques as they are applied to the component or interfaces with that component.

The techniques associated with numerals 1-2 are not utilized when a device 132 generates its own credentials in the form of a public/private key pair and a certificate request.

Offline Credential Generation

Numeral one refers to anti-cloning techniques applied to the offline generator 114 and OFFCA 152.

When dealing with large volume of data generation with multiple ID/address spaces, it is difficult but critical to make sure IDs are not used more than once either accidentally or purposely. When importing external acquired data from other authorities, in multiple places bad data or duplicate/ "cloned" data may occur in the following ways. First, data may be inserted multiple times (by operational staff) during importing to the application/database. Second, data may be corrupted or duplicated from the source (external authority). Third, data may be corrupted during transmission. Fourth, same IDs from the original source (external authority) may be used multiple times in the following ways.

Further, when generating device identity data or repackaging external data for their final destinations (factory servers or OTA servers), duplicated keys may be introduced in the following ways. First, the same external data may be used multiple times, and second, the same IDs may be used multiple times.

Figure 3:
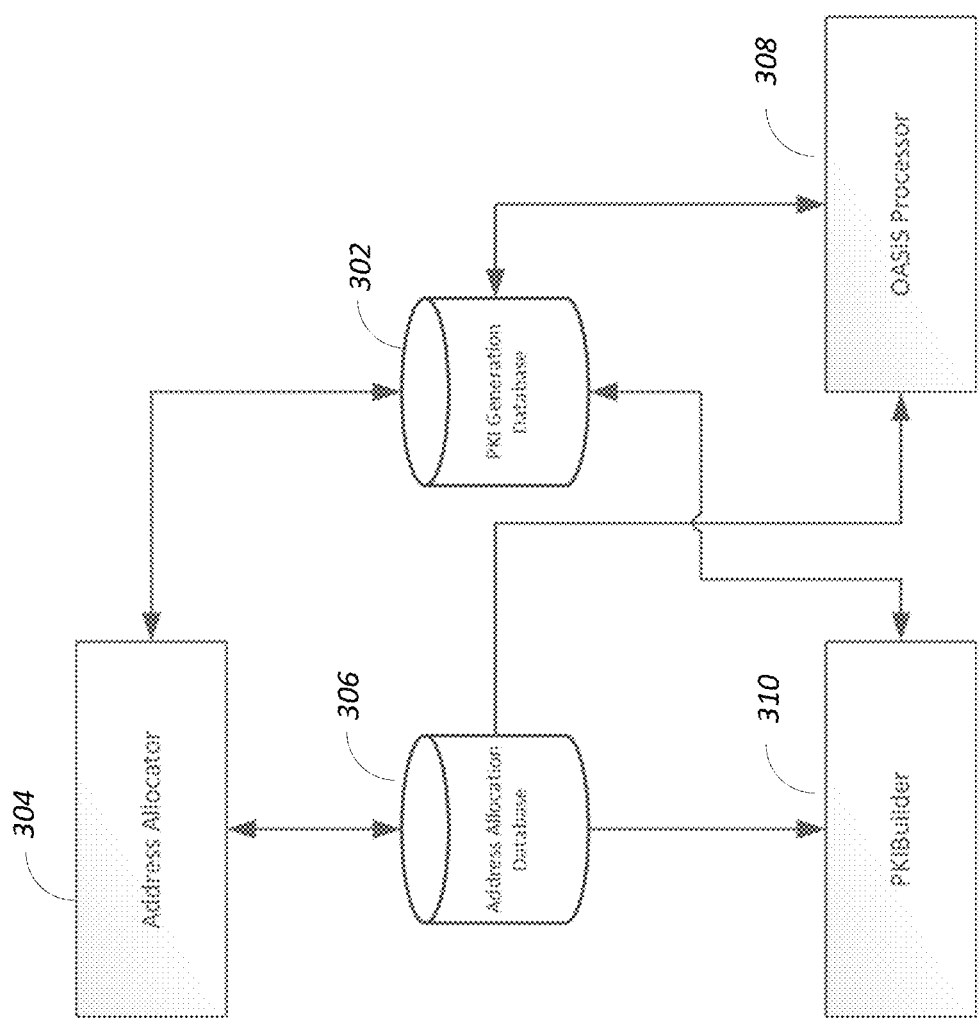
FIG. 3 is a diagram illustrating system components that are used by the offline generator to generate credentials.

FIG. 3 is a diagram illustrating system components that are used by the offline generator 114 to generate credentials. The system includes an address allocator 304, an external credential processor (hereinafter alternatively referred to as OASIS processor) 308, and the credential builder 310. The address allocator 304 includes a dedicated application along with a database to manage ID/address types (ex. device serial number, MAC address, etc.) and spaces.

The address allocator 304 offers "next available" address (NAA), address skipping (AS); address reservation (AR), and has mechanisms to makes sure any IDs in different usages (NAA, AS and AR) are not used more than once. With NAA, each set of credentials gets assigned the "next available" unused device identifier. With address skipping refers to a situation wherein a device needs a block of consecutive identifies. That is common with MAC Addresses—a device utilizes some of those MAC Addresses in certificates while others in same consecutive block might be assigned to other elements such as ab Ethernet port, USB port, etc. and not in a certificate. For example:

Base MAC Address—for cable HFC interface and in DOCSIS certificate
Base+1 MAC Address for Ethernet port
Base+2 MAC for VoIP interface and PacketCable certificate
Base+3 MAC Address for USB port (no certificate).

With address reservation, specific customers require their own range of device identifiers. The system reserves a separate range of device identifiers for a specific credentials type for a specific customer.

The OASIS processor 308 is a software module for managing externally acquired data. It works alongside the address allocator 304 to eliminate the re-use or misuse of IDs. It also verifies incoming data to assure that no corruption or duplication of IDs, both on a file level and on a record level.

The credential builder 310 is a software module that performs the credential building operations. The credential builder 310 performs double checks to eliminate the re-use or mis-use of IDs. Each data record/batch is generated specifically for a destination server, meaning it is encrypted with a server-specific database encryption key. Once that batch of credentials is loaded into a server, it is marked as used prevent the same data from being loaded by credential loader 110 again to a different server/location.

ID management is performed by the address allocator 304, which assures that no IDs can be used twice and no ID range can be used twice. This is accomplished via pre-allocation (AS and/or AR specifically for a product/PKI type) or "next available" of device address/identity. The address allocator also prevents IDs from being reused for different factories and/or servers and prevents IDs from being reused between PKI types and/or products. U.S. Pat. No 9,043,456, which is hereby incorporated by reference herein, illustrates an identity management system for high volume production of product specific identity data that may be used with such a system.

The External Credential Processor 308 operates on externally acquired data. Some external authorities permit device identifiers to be submitted by a manufacturer and in that case External Credential Processor 308 obtains a block of unique and previously unused device identifiers from Address Allocator and submits them to external authority as part of a request for a block of device credentials. Obtained device credentials in that case should contain device identifiers that came originally from Address Allocator and can be cross-checked by External Credential Processor 308 to make sure that they match what has been allocated in the Address Allocator's 306 database. Other external authorities generate their own unique device identifiers. In that case, External Credential Processor 308 does not generate internal device identifiers. External device identifiers and credential data are checked by External Credential Processor and rejected if external authority provides duplicates.

The OASIS processor 308 assures that each ID can be used only once, and prevents file/batch level data cloning by file hash checking (in case the operational staff is trying to load data twice). The OASIS processor 308 also prevents record level data cloning by record hash checking. The OASIS Processor also provides full traceability on data importing and consumption by the PKI builder 310.

The credential builder 310 operates according to a generation request entered by the address allocator 304. The IDs used in such generation can only be obtained from the address allocator 304, and the credential builder 310 also cross-checks the address allocation database 306 to assure any provided ID agrees with that which is stored in the address allocation database 306. Each provided and used ID can be used only once, and each ID is saved along with an archived data record to allow for confirming that the ID has only been used once and tracing any violations of this rule.

When the requested credentials include a public/private key pair (and also possibly a digital certificate), a fingerprint (such as a hash) of the public key is generated, and checked against a table of previously utilized public keys. If the hash of the previously generated public key is found, this new set of credentials is rejected and another is generated. If the hash of the previously generated public key is found, the credential is accepted and the public key of the accepted credential is added to the table of previously utilized public keys. One example of how such a paradigm can be performed is disclosed in U.S. Patent Publication 2019-0245701, which is hereby incorporated by reference.

The credential builder 310 always creates new data blobs for each generation of new credentials that are created in a particular run. The crypto library having the algorithms for generating the credentials is also stress tested to provide high quality keys and random numbers. Such random numbers may be HSM based. The credential generation facility 102 also encrypts generated data for a specific destination credential server 122. Consequently, that data is useless and cannot be loaded on other servers. Alternatively, the credential generation facility 102 pre-encrypts each set of credentials according to a unique key of each client device 132 or chip within the client device. The credential builder 310 also maintains a data generation history (e.g. log), and archives the generated credential data as doubly encrypted archive data, thus offering full traceability.

ID management can also be performed as follows. To perform offline data generation is response to a request for a specific server, such data may require generation by an external CA, or may be generated by the credential builder 310. In the processing for credential data from an external CA but using locally generated and managed IDs (addresses), a new ID range for OASIS (external) type data is allocated by the address allocator 304. This ID range is used to create an OASIS request (e.g. CSR or other types key request) and submit the OASIS request to the external CA authority. When data is received from the external CA, that data is imported into the PKI generation database 302.

In the processing for internally generated or re-packaged credential data, a new ID range is allocated for the PKI type data by the address allocator 304, and the credential builder 310 receives the assigned ID range when generating device credentials. If the requested credential type requires OASIS (external) data, the credential builder 310 consumes the external data previously imported into the credential generation database 302.

Figure 4:
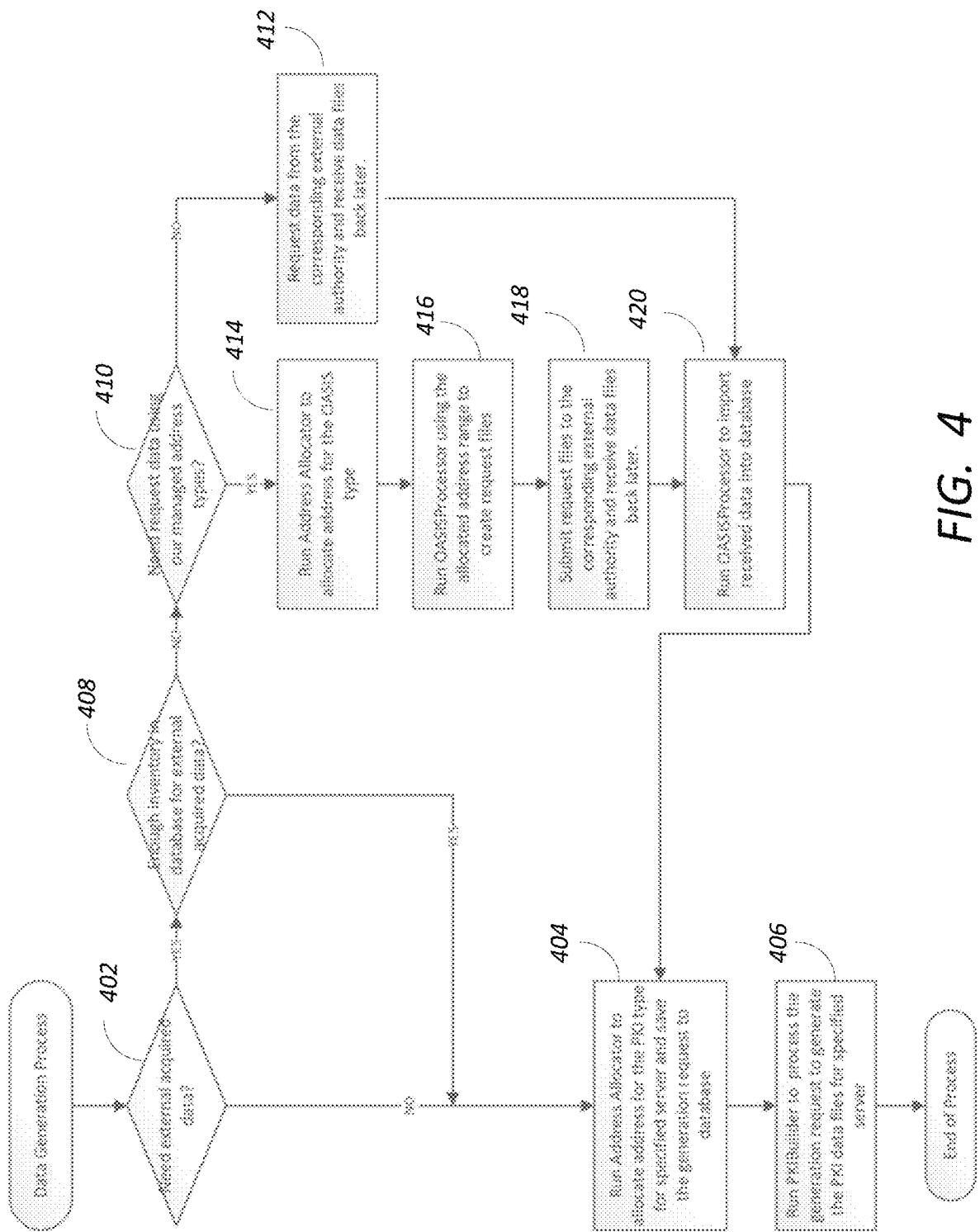
FIG. 4 is a diagram illustrating exemplary operations used for offline data generation in response to a request for a specified credential server.

FIG. 4 is a diagram illustrating exemplary operations used for offline data generation in response to a request for a specified server. Block 402 determines if external data (e.g. data from an external CA) is required. If block 402 tests no, the address allocator 304 allocates an address range for the credential type for a specified server and saves the request to the generation database 302. In block 405 the credential builder 310 processes the request to generate credentials by generating the credential data files for the specific server. and associates the credentials with the address.

If block 402 tests yes, the credential builder checks to determine if there is sufficient inventory of credentials received from the external CA already received and stored in the PKI generation database 302. If there is sufficient inventory, processing is routed to blocks 404 and 406 and that credential builder 310 runs the address allocator to allocate the address (ID) for the credential type and the specified server and saves the generation request to the credential database 302. The credential builder 310 then reads the credentials in the inventory and generates the credentials for the specified server.

If there is insufficient inventory, processing is routed to block 410 which determines if there is a need to request data using the managed address types used by the credential generator 114. If the address types to be used (e.g. IDs) are not those which are subject to management, processing is routed to block 412, which requests data from the external CA authority, and later receives the requested credentials. The OASIS processor then imports the received data into the PKI generation database 302, and routes processing to blocks 404 and 406, in which the address allocator allocates an address for the PKI type for the specified server and saves the generation request to the PKI generation database 302, and the credential builder processes the generation request for the credential data files for the specified server.

If the address types to be used (e.g. IDs) are those which are subject to management, processing is routed to block 414. In block 414, the address allocator 304 allocates a new ID range for the data type. In block 416 ID range is used to create a credential service request files for the OASIS processor 308 to submit to the external CA. The request files are submitted to the external CA and later receives the requested credentials, as shown in block 418. Processing is then routed to block 420 which receives the requested credentials from the external CA and imports such credentials to the PKI generation database 302. Processing is then routed to blocks 404 and 406.

Credential Loader

Numerals two and three refers to anti-cloning techniques applied to the credential loader 110 and the anti-cloning techniques applied to the interface between the credential loader 110 and the credential server 122 and update server 168, respectively.

There are several cloning vulnerabilities that relate to the credential loader 110. First, the same file having the credentials could be loaded more than once to the credential server 220 or update server 168. Second, the same file with a different file name could be loaded more than once to the credential server or update server 168. Finally, the same credential record could be loaded more than once to the credential server 122.

Figure 5:
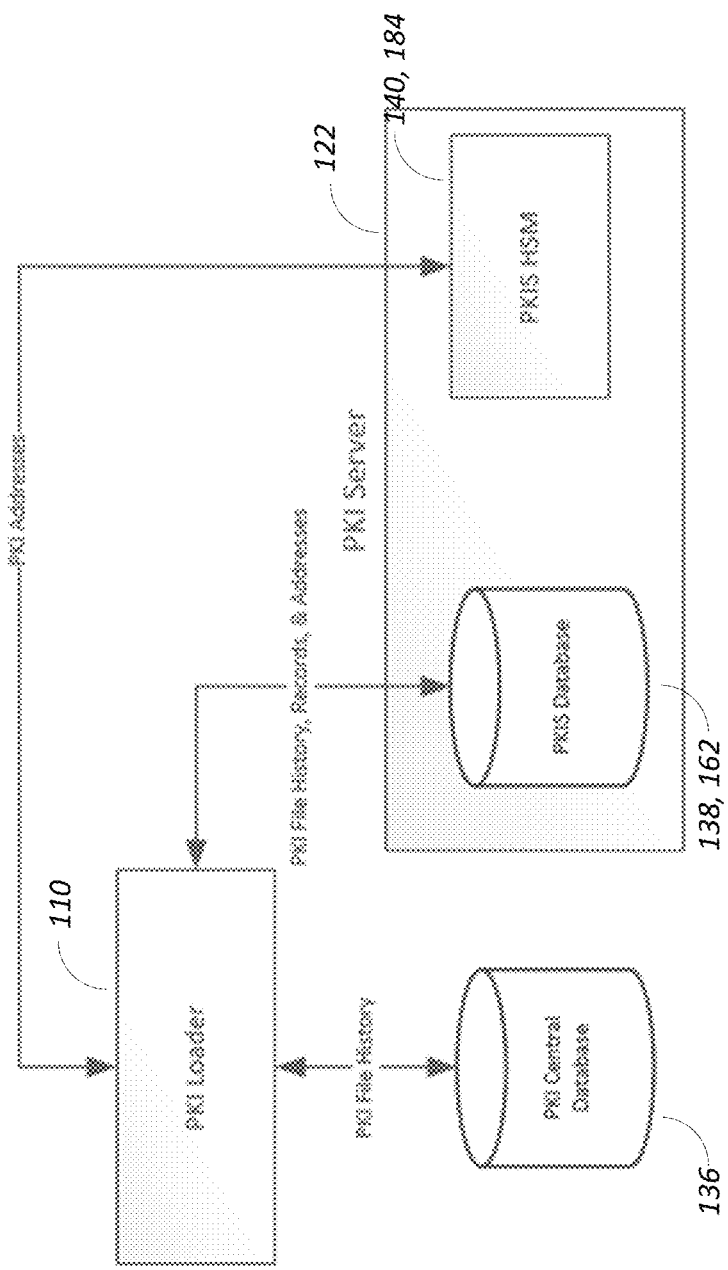
FIG. 5 is a diagram illustrating system elements used to protect the interface between the credential loader, the credential server, and the update server.

FIG. 5 is a diagram illustrating system elements used to protect the interface between the credential loader 110, the credential server 122, and the update server 168. Before providing the credential file to the credential server 122, the credential loader 110 checks the credential central database 136 and the credential server and update databases 138 and 182 to assure that the credential file about to be provided was not previously loaded into the credential server 122 or update server 168. The credential loader 110 also checks the credential central database 136 and the credential server and update databases 138 and 182 to determine if a hash of the credential file was not previously loaded. The credential loader 110 also checks the credential server and update database 138 and 156 and the credential server HSM 140 and ONCA HSM 184 to assure that each credential record's address (ID) was not previously loaded. The credential loader 110 provides the credential file to the credential server 122 and update server 168 only if all of the foregoing checks indicate that the credential file, hash of the credential file, and address of the credential file have all not been previously loaded into the credential server 138 and update server 168 databases, respectively.

Credential Server and ONCA

Numerals four and twelve refer to anti-cloning techniques applied to the credential server 122 and ONCA 168, respectively. There are several cloning vulnerabilities that relate to the credential server 122 and ONCA 168.

Database Backup and Duplication

First, the credential server 122 and ONCA 168 maintain databases 138, 182 of device identities (possibly encrypted) that may be copied to other credential servers 122 and ONCAs 168 in the same and/or different factory location, resulting in cloned devices.

Second, a backup of each database 122 and 168 may be restored on the same or another server to recover from server's failure, with the unintended result: device identities that were already programmed into manufactured devices reappear on a credential server 122 and ONCA 168 and are used again to program other devices, thus creating cloned devices.

Third, the same credential server 122 and ONCA 168 may field multiple requests for manufactured devices 132 for the same device identity (e.g., MAC Address). The credential server 122 and ONCA 168 may respond with the same set of cryptographic credentials multiple times, assuming that these multiple requests are retries or perhaps a device is being repaired and needs to re-install the same identity. However, these multiple requests may be a part of an intentional attack by an adversary in the factory intending to create clones.

To ameliorate these issues, the credential server 122 and ONCA 168 databases 138, 182 contains encrypted records. The records are encrypted by the credential server 122 and ONCA 168's specific database encryption key (DEK) during initial generation by the credential builder 310. The credential server 122 and ONCA 168 store the DEK in its HSM 140, 184, and decrypts a set of device credentials with the DEK temporally immediately before they are to be delivered to the manufactured device 132. Copying the same database to another server would render the database unusable because the DEK is not available to any other server and cannot be copied from the HSM 140, 184. Other techniques for ameliorating this problem are disclosed in U.S. Pat. No. 8,761,401, which is hereby incorporated by reference herein.

Another anti-cloning technique is for the HSM 140, 184 to be used to enforce a record of used and unused device identities. HSMs are considered as a more reliable source to keep track of the consumption of device identities as compared to database. When database 138, 182 contents are corrupted or modified, the discrepancies between the database 138, 182 content and analogous data stored by the HSMs 140, 184 are detected and addressed.

Before a block of consecutive device addresses (e.g., MAC Addresses or some other sequential identifiers) and corresponding identities are loaded into a server 122, 168), an HSM 140, 184 update occurs. The credential loader 110 sends signed message to respective server 122, 168, and HSM 140, 184 objects are created identifying this range of identities. HSM object details are credentials type-specific, and credentials with multiple (N) consecutive device IDs will result in a N objects created on the HSM 140, 184.

When the server 122, 168 finds the next unused set of credentials with a device identifier in its database—it checks these objects on the associated HSM 140, 184 to make sure this device identifier is still available/unused If the databases 138, 182 are restored from backup—the data stored on the HSMs 140, 184 can be used to identify any previously used identifiers found in the databases 138, 182, and these identifiers will be internally rejected and cleaned up.

Certificate Signing Requests Having Duplicate Public Keys

Another cloning vulnerability relating to the credential server 122 and ONCA 168 involves the handling of certificate signing requests (CSRs). The devices 132 generate their own public/private key pair and CSR. The credential server 122 or ONCA 168 may receive CSRs having the same public key from multiple device 132, causing the credential server 122 or ONCA 168 to issue new credentials for each device, but with the same public key, thus creating cloned identities. Also, multiple different credential servers 122 and ONCAs 168 may receive CSRs with duplicate public keys. Such different servers 122, 168 do not check against a common repository of previously seen public keys, and hence, may end up issuing digital certificates with the same public key.

These issues can be ameliorated by assuring that the credential server 122 and ONCA 168 each maintain a database of fingerprints (i.e. hash values) of previously seen public keys. The CSR is rejected if the hash of the public key of the incoming CSR matches a previously recorded value. Further, a particular model of the device 132 may be marked as compromised if this occurs more than a threshold number of times for devices of that model (thus indicating a newly discovered vulnerability). In this case, all CSRs coming from devices of that particular model will be rejected, but may be re-enabled later if the device 132 provides a later software version number along with the CSR indicating that the updated software has resolved the vulnerability. Since the credential servers are located at each factory, the duplication check may need to occur at a central server where stores all the data that are replicated back from each factory credential server.

Credential Server/Credential Station Interface

Numeral five refers to anti-cloning techniques applied to the credential server 122 and credential station 128 interface. There are several cloning vulnerabilities that relate to the credential server 122 and credential station 128 interface. First, an unauthorized party may impersonate a legitimate credential station 128 to siphon device credentials. Second, an unauthorized party may intercept/record network communications between the credential server 122 and the credential station 128. In this case, if a global decryption key used by a device model is compromised, those device identities can be fully decrypted and posted on a pirate website for creation of clones. Solutions to these issues are discussed in U.S. Pat. No. 8,761,401 and below.

First, the communications between the credential server 122 and the credential station 128 are protected with 2 way authenticated TLS. Thus, all communications are encrypted and protected from replays. Also, since in some cases, TLS sessions can be terminated by an HTTPS proxy in front of a credential station 128, additional application-level session authentication is also applied. Request messages originating from the credential station 128 are signed with the credential station's private key and digital certificate (in addition to standard TLS session security). The credential server 122 is updated via a credential requestor interface with a list of authorized credential station identities for each credential type available on that credential server 122. The credential server 122 also checks the identify inside the credential station's certificate to make sure it is authorized to request the particular type of credentials.

Credential Station

Numerals six and ten refer to anti-cloning techniques applied to the credential station 128. There are several cloning vulnerabilities that relate to the credential station 128. First, the credential station's cryptographic TLS identity may be compromised and utilized by unauthorized parties to siphon device credentials. Second, the credential station's software may be compromised and utilized by unauthorized parties to forward device credentials to an unauthorized device which may not even be in the same factory. Finally, the credential station 128 might be compromised and controlled by attacker's command & control system to generate signed legitimate requests to credential server 122 which are sent from attacker's remote machine.

Token node locking can be used to ameliorate this issue. Anti-cloning techniques include protecting the credential station's identity inside a cryptographic token 130 such as an HSM, from which the identity cannot be duplicated. A fingerprint of the credential station 128 is securely stored in the token 130. The token identity and fingerprint are registered with a token binding service (TBS). The credential station 128 checks to determine if its fingerprint has changed (for example, the fingerprint may change due to replacement of hardware parts), and if so, obtains authorization from the TBS for a new fingerprint. This prevents the use of a crypto token 130 with an unauthorized local or remote host, and prevents an attacker's host what may have already stolen the global decryption key from obtaining and then decrypting the credential sets of the devices 132.

Further exemplary token node locking techniques are described in U.S. Patent Publication 2021/0297269, U.S. Patent Publication 2021/0297449, U.S. Patent Publication 2021/0297254 and U.S. Patent Publication 2021/0349986, all of which are incorporated by reference herein.

Credential Station/Device Interface

Numeral seven refers to anti-cloning techniques applied to the credential station 128/device 132 interface. There are several cloning vulnerabilities that relate to the credential station 128/device 132 interface. This interface is normally unprotected, since it is product specific and factory-specific. Accordingly, credentials may be intercepted on the interface between the credential station 128 and the device 132. Further, the same globally encrypted device credentials may be replayed to multiple devices 132, thus creating clones, or a global encryption key present in each device 132 may be compromised and clear credentials may be posted on an attacker's website.

Anti-cloning techniques are described in U.S. Pat. No. 8,761,401. Key agreement techniques (e.g. Diffie-Hellman or Elliptic Curve Diffie-Hellman) can be used to establish a one-time session encryption key for each transaction between the credential server 122 and the device 132. This agreement is transparent to the credential station 128, as it is an application layer between the credential server 122 and the device. The device 132 generates a random key agreement keypair, provides its public key to credential station 128, which includes it in a request message to credential server 128. The credential server 128 generates its own one-time key agreement keypair, derives a session key to encrypt the response and includes its public key in response so that device can generate same session key. This session key is used for the transaction thereafter.

Another anti-cloning technique is to assure that the interface between credential station 128 and device 132 does not utilize a shared network. This is because the device without credentials cannot authenticate itself at this time and a man in the middle attack is possible, for example, by using a USB, serial port or peer-to-peer Ethernet connection to manufactured device 132.

Device

Numeral eight refers to anti-cloning techniques applied to the device 132. There are several cloning vulnerabilities that relate to the device 132. First, clear device identity credentials may be extracted out of the device 132 via static analysis, runtime probing, attacker-installed malware, debugger other HW-based or SW-based tools. Or, the encrypted device identity credentials may be extracted from device, and decrypted via crypto-analysis, brute force attacks or side channel attack is used to figure out decryption key in the device 132.

Anti-cloning techniques include both hardware and software related techniques. Secret information (keying material) that the device 132 needs to decrypt credentials may be stored using hardware or software (e.g. whitebox) techniques. With respect to hardware protection techniques, clear keying material may be only available in short periods of time in volatile memory (RAM), decrypted right before it is used and then cleared out of memory right afterwards Further, clear keying material may be only available inside TEE (Trusted Execution Environment) which utilizes secure internal memory that cannot be probed on a memory bus. In the alternative or in addition to the foregoing, the memory bus of the device may be encrypted.

With respect to software techniques, whitebox techniques to protect device's secret keys in software. In this embodiment, secret keys are inherently stored in the whitebox-encoded form and node locked and cannot be used on other devices. At factory provisioning time, device fully decrypts credentials using the node locked whitebox decryptor implemented on the device 132, and re-encrypts the credentials using one of the above HW or SW protected device unique keys. Alternatively, credential builder 110 can simply encrypts device credentials with a unique per-device key.

White-box cryptography node-locking restricts the operation of a white-box implementation to a specific node to mitigate code-lifting attacks, which is where the implementation is moved from an authorized node to an unauthorized one. A node can refer to a hardware device, containerized environment, virtual machine instance or any combination thereof along with any combination of application, customer, and end-user identifiers. The definition of a node is configured by the developer based on the data elements that comprise a node's fingerprint, which is the unique identifier of that node. The anti-cloning is achieved by locking the implementation of all white-box crypto operation in the runtime to a specific node/device preventing the copied software to function on cloned device.

Secure cloud-based node-locking service with built-in attack detection to eliminate fuzzing, cloning attacks is an extended service that can also be deployed. White-box base files are securely stored on the cloud service and are not vulnerable to accidental leakage. A secure cloud-based dynamic secret encoding service reduces the risk of exposure of unprotected secrets and other sensitive data. Node locked whitebox techniques are discussed in U.S. Patent Application 2018/0167197, which is hereby incorporated by reference.

Central Database and Reporting System

Numeral nine refers to system wide anti-cloning techniques that use a central database and reporting system to identify cloned devices. The issue is that multiple devices can be assigned the same serial number or other identifier allocated in the factory or otherwise out of the credential provision systems 100A and 100B. For example, if the factories are decentralized and not coordinated, the same identifier may be allocated to multiple devices.

This is ameliorated by gathering provisioning history information, including all assigned credentials and device identifiers into a central database. An analysis and reporting system (ARS) detects duplicated factory assigned identifiers and alerts entities that would like to participate in the prevention of cloning (e.g. manufacturers or network operators that fielded the devices 132).

Duplicate Detection System

Numeral eleven refers to system wide anti-cloning techniques that collects data regarding possible credential duplicates over time and can provide foundational information for future analysis and determination of cloning countermeasures. This is to address the fact that it is possible for multiple devices to be cloned and fielded with the same credentials and the same identity despite substantial security measures.

This cloning threat analysis gives security designers greater visibility into evolving and emerging cloning threats. Credential monitoring tags potential duplicates as they occur, collects and logs data on the duplicate events, prevent duplicates from entering the system, raises alarms, maintains event/log detail records, and queries to extract data on demand for reporting purposes.

Anti-cloning measures include detecting multiple devices with the same identity in different geographic locations. This can be accomplished by use of the device 132 IP addresses, communication network delays (e.g. drastically different round-trip times), MAC addresses and the like.

Once a duplicate is detected, this system queries the ARS to obtain additional information regarding this duplicated identity. This additional information may include where and when device was manufactured, and which credential station 128 was utilized in to obtain the credential. Additional information may also include whether the credentials were field-provisioned or loaded in the factory (and where and when such provisioning occurred), which other credentials/identities were provisioned into the same device. All identities/credentials loaded into cloned device can be either revoked or selectively de-authorized for services that are delivered to the device.

When Provisioning Server receives credentials requests from devices, a request can include device model information. This device model information is then gathered into the ARS repository and provided to the duplicate detection system.

Duplicate detection system may determine that too many devices of a specific model ended up with duplicates and therefore Provisioning Server needs to block all further requests from devices of this model. OPUS receives a command from Provisioning Server to disable a device model and after that—rejects any requests for any type of credential from this device model indicated in a request message. Furthermore, all credentials provided to all devices of this same model may be revoked if requested by the duplicate detection system. Device model can be identified in a device certificate attached to a provisioning request.

Furthermore, a device can have a software update that fixes this widespread cloning problem. Once the problem is fixed, duplicate detection system may send another command to the Provisioning Server to unblock this device model and devices of this model will be allowed to request device credentials again.

ONCA/Device Interface

Numeral thirteen refers to anti-cloning techniques applied to the ONCA 168 device 132 interface. There are several cloning vulnerabilities that relate to the credential station 128/device 132 interface. One such vulnerability is the interception of credentials in the interface between the ONCA 168 and the device 132, with those same globally encrypted device credentials replayed to multiple devices, creating clones Another such vulnerability is the compromise of a global encryption key present in each device permitting access to credentials and the clear credentials posted on attacker's website. A similar vulnerability is that the credentials are provided to a device fielded by an untrusted operator which could end up extracting clear credentials from device right after it decrypts them, or that the credentials are provided to a subscriber device that's not authorized by an operator and is instead held by a pirate capable of extracting decrypted credentials from that device. Such vulnerabilities are ameliorated by the techniques disclosed in U.S. Pat. Nos. 9,130,928, 9,330,250, and 9,438,584 all of which are incorporated by reference herein.

A key agreement (Diffie-Hellman or Elliptic Curve Diffie-Hellman) can be used to establish a one-time session key for each transaction between the ONCA 168 and the device 132. With this technique, the device 132 generates a random key agreement keypair, and provides the public key in the credential request sent to the ONCA 168, and the ONCA 168 generates its own one-time key agreement keypair, derives a session key to encrypt the response and includes it's public key in the response so that the device 132 can generate the same session key.

Also, the device 132 may provide an operator ID to the ONCA 168 specifying a particular network operator. The ONCA 168 verifies that this operator is authorized for the requested type of credential before the credential is supplied. Another technique is for the device 132 to obtain authorization token from another subscriber device 132 that proves request is coming from an authorized subscriber. The ONCA 168 verifies that this operator is authorized for the requested type of a credential Still another technique is for the device 132 to provide the ONCA 168 with subscriber credentials which the ONCA 168 forwards to subscriber authentication/authorization server for validation. The ONCA 168 verifies that subscriber is authorized prior to returning requested credentials.

Hardware Environment

Figure 6:
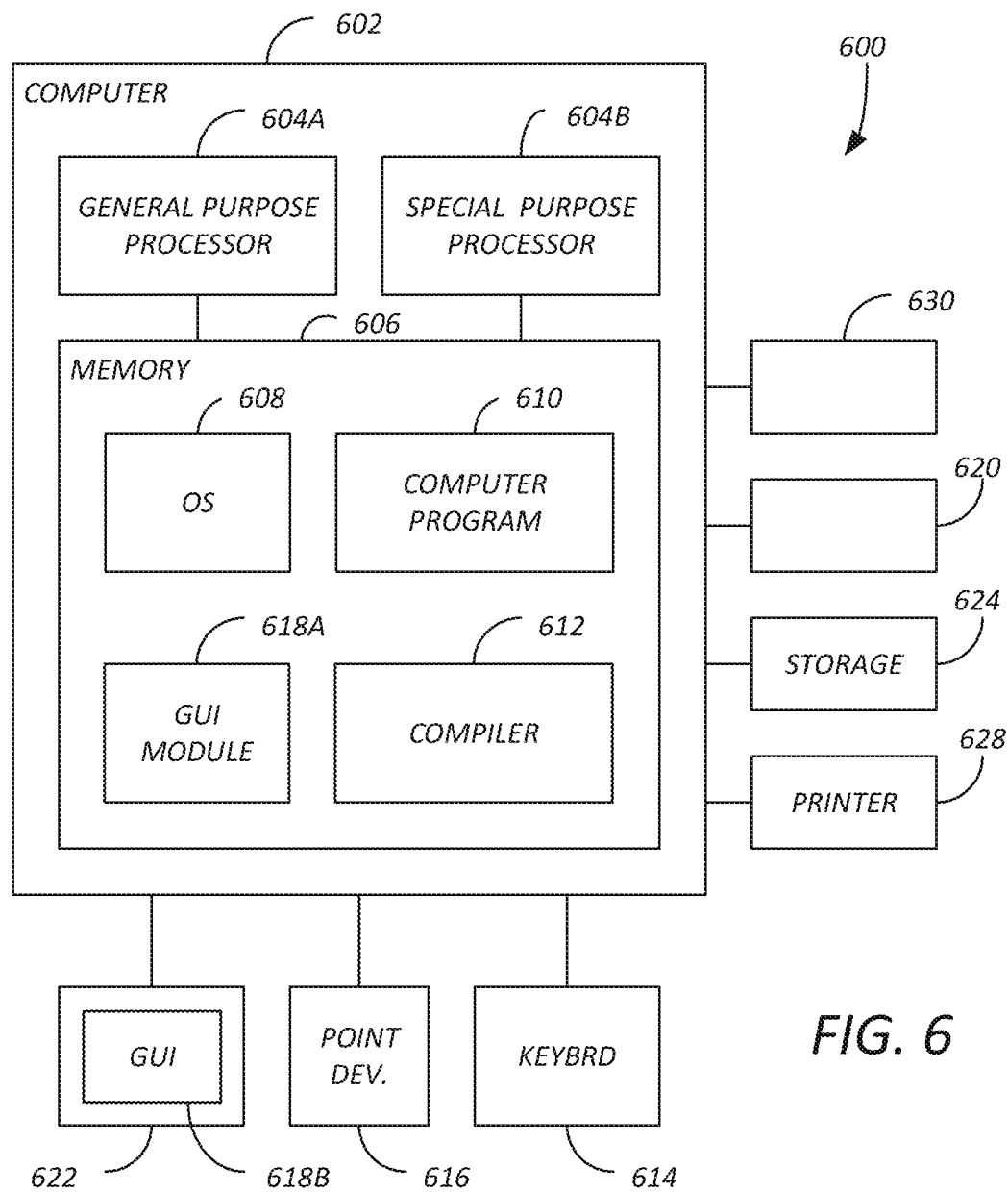
FIG. 6 illustrates an exemplary computer system that could be used to implement processing elements of the system.

FIG. 6 illustrates an exemplary computer system 600 that could be used to implement processing elements of the above disclosure. The computer 602 comprises a processor 604 and a memory, such as random access memory (RAM) 606. The computer 602 is operatively coupled to a display 622, which presents images such as windows to the user on a graphical user interface 618B. The computer 602 may be coupled to other devices, such as a keyboard 614, a mouse device 616, a printer 628, etc. Of course, those skilled in the art will recognize that any combination of the above components, or any number of different components, peripherals, and other devices, may be used with the computer 602.

Generally, the computer 602 operates under control of an operating system 608 stored in the memory 606, and interfaces with the user to accept inputs and commands and to present results through a graphical user interface (GUI) module 618A. Although the GUI module 618B is depicted as a separate module, the instructions performing the GUI functions can be resident or distributed in the operating system 608, the computer program 610, or implemented with special purpose memory and processors. The computer 602 also implements a compiler 612 which allows an application program 610 written in a programming language such as COBOL, C++, FORTRAN, or other language to be translated into processor 604 readable code. After completion, the application 610 accesses and manipulates data stored in the memory 606 of the computer 602 using the relationships and logic that was generated using the compiler 612. The computer 602 also optionally comprises an external communication device such as a modem, satellite link, Ethernet card, or other device for communicating with other computers.

In one embodiment, instructions implementing the operating system 608, the computer program 610, and the compiler 612 are tangibly embodied in a computer-readable medium, e.g., data storage device 620, which could include one or more fixed or removable data storage devices, such as a zip drive, floppy disc drive 624, hard drive, CD-ROM drive, tape drive, etc. Further, the operating system 608 and the computer program 610 are comprised of instructions which, when read and executed by the computer 602, causes the computer 602 to perform the operations herein described. Computer program 610 and/or operating instructions may also be tangibly embodied in memory 606 and/or data communications devices 630, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

Conclusion

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A credential distribution system for providing device credentials to a plurality of devices, comprising:
   a credential builder, for generating the credentials or procuring the credentials from a source external to the credential distribution system;
   a credential loader;
   a credential server, for accepting credential requests from the devices and for receiving the requested credentials from the credential loader;
   a first secured interface, communicatively coupling the credential loader and the credential server;
   a second secured interface, communicatively coupling the credential server and the device;
   a central credential database, communicatively coupled to the credential loader, for storing each the credentials and a provisioning history of each of the credentials;
   a credential server database, communicatively coupled to the credential server, for storing the credentials local to the credential server; and a cloning detection system, communicatively coupled to the central credential database and the credential server database, the cloning detection system for:
  detecting duplicate credentials using the credentials stored in the central credential database and the credential server database;
wherein the credential loader checks the central credential database and the credential server database to determine that the credential was not previously loaded in the credential server before loading a new credential in the credential server;
wherein the credential loader compares a hash of the credential stored in the central credential database with a hash of the credential stored in the credential server database.

2. The credential distribution system of claim 1, wherein: the central credential database comprises geographic information associated with each credential; and
the cloning detection system detects duplicate credentials by identifying multiple devices having the same credential at different geographic locations.

3. The credential distribution system of claim 2, wherein the geographic information is selected from a group comprising:
  an IP address associated with each credential;
  a network delay associated with each credential; and
  a MAC address associated with each credential.

4. The credential distribution system of claim 2, wherein the cloning detection system performs at least one of:
  tagging potential duplicate credentials; and
  collecting and logging credential events to generate the provisioning history.

5. The credential distribution system of claim 4, wherein: the cloning detection system queries the central credential database to fetch the provisioning history of detected duplicate credentials.

6. The credential distribution system of claim 1, wherein:
  the credential server is communicatively coupled to a hardware security (HSM) module storing the credentials previously provided to the credential server; and
  the credential loader checks the credential server database and the HSM to determine that the credential was not previously loaded in the credential server before loading a new credential in the credential server.

7. The credential distribution system of claim 1, wherein:
  the credential server receives a signed message from the credential loader requiring a block of consecutive device sequential identifiers;
  a hardware security module creates a plurality of objects identifying the block of consecutive device identifiers; and
  before providing a credential associated with one of the sequential identifiers to the credential server, the credential loader reads the plurality of objects identifying the block of consecutive device identifiers to determine if the one of the sequential identifiers is already used for another credential.

8. The credential distribution system of claim 1, wherein the credential builder comprises:
  an address allocator, for managing device identifiers to eliminate re-use of identifiers;
  a credential generator, communicatively coupled to the address allocator for generating the credentials using the managed device identifiers; and
  an external processor, communicatively coupled to the address allocator and the credential generator, for procuring the credentials from the source external to the credential distribution system.

9. The credential distribution system of claim 1, wherein:
  the credential server database includes a hash of every public key received from the devices as a part of a certificate signing request; and
  when the credential server receives a certificate signing request having a public key from a requesting device, the credential server computes a hash of the public key and compares the hash of the public key to the hash of every public key received from the devices to determine if the public key received with the certificate signing request is a duplicate.

10. The credential distribution system of claim 9, wherein:
  the cloning detection system marks a model to which the requesting device belongs as compromised if more than a threshold number of duplicates are identified.

11. A credential distribution system for providing device credentials to a plurality of devices, comprising:
  a credential builder, for generating the credentials or procuring the credentials from a source external to the credential distribution system;
  a credential loader;
  a credential server, for accepting credential requests from the devices and for receiving the requested credentials from the credential loader;
  a first secured interface, communicatively coupling the credential loader and the credential server;
  a second secured interface, communicatively coupling the credential server and the device;
  a central credential database, communicatively coupled to the credential loader, for storing each the credentials and a provisioning history of each of the credentials;
  a credential server database, communicatively coupled to the credential server, for storing the credentials local to the credential server; and
  a cloning detection system, communicatively coupled to the central credential database and the credential server database, the cloning detection system for:
    detecting duplicate credentials using the credentials stored in the central credential database and the credential server database;
  wherein the credential loader checks the central credential database and the credential server database to determine that the credential was not previously loaded in the credential server before loading a new credential in the credential server;
  the credential server receives a signed message from the credential loader requiring a block of consecutive device sequential identifiers;
  a hardware security module creates a plurality of objects identifying the block of consecutive device identifiers; and
  before providing a credential associated with one of the sequential identifiers to the credential server, the credential loader reads the plurality of objects identifying the block of consecutive device identifiers to determine if the one of the sequential identifiers is already used for another credential.

12. The credential distribution system of claim 11, wherein:
  the central credential database comprises geographic information associated with each credential; and
  the cloning detection system detects duplicate credentials by identifying multiple devices having the same credential at different geographic locations.

13. The credential distribution system of claim 12, wherein the geographic information is selected from a group comprising:
an IP address associated with each credential;
a network delay associated with each credential; and
a MAC address associated with each credential.

14. The credential distribution system of claim 12, wherein the cloning detection system performs at least one of:
tagging potential duplicate credentials; and
collecting and logging credential events to generate the provisioning history.

15. The credential distribution system of claim 14, wherein:
the cloning detection system queries the central credential database to fetch the provisioning history of detected duplicate credentials.

16. The credential distribution system of claim 11, wherein:
the credential server is communicatively coupled to a hardware security (HSM) module storing the credentials previously provided to the credential server; and
the credential loader checks the credential server database and the HSM to determine that the credential was not previously loaded in the credential server before loading a new credential in the credential server.

17. The credential distribution system of claim 11, wherein the credential builder comprises:
an address allocator, for managing device identifiers to eliminate re-use of identifiers;
a credential generator, communicatively coupled to the address allocator for generating the credentials using the managed device identifiers; and
an external processor, communicatively coupled to the address allocator and the credential generator, for procuring the credentials from the source external to the credential distribution system.

18. The credential distribution system of claim 11, wherein:
the credential server database includes a hash of every public key received from the devices as a part of a certificate signing request; and
when the credential server receives a certificate signing request having a public key from a requesting device, the credential server computes a hash of the public key and compares the hash of the public key to the hash of every public key received from the devices to determine if the public key received with the certificate signing request is a duplicate.

19. The credential distribution system of claim 18, wherein:
the cloning detection system marks a model to which the requesting device belongs as compromised if more than a threshold number of duplicates are identified.

* * * * *